(12) United States Patent
Gao et al.

(10) Patent No.: US 10,009,885 B2
(45) Date of Patent: Jun. 26, 2018

(54) METHOD AND DEVICE FOR TRANSMITTING DATA AT DIFFERENT REPETITION LEVELS, AND METHOD AND DEVICE FOR RECEIVING DATA AT DIFFERENT REPETITION LEVELS

(71) Applicant: Panasonic Intellectual Property Corporation of America, Torrance, CA (US)

(72) Inventors: Chi Gao, Beijing (CN); Hidetoshi Suzuki, Kanagawa (JP); Lilei Wang, Beijing (CN); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 21 days.

(21) Appl. No.: 15/111,456

(22) PCT Filed: Jan. 28, 2014

(86) PCT No.: PCT/CN2014/071714
§ 371 (c)(1),
(2) Date: Jul. 13, 2016

(87) PCT Pub. No.: WO2015/113230
PCT Pub. Date: Aug. 6, 2015

(65) Prior Publication Data
US 2016/0338020 A1    Nov. 17, 2016

(51) Int. Cl.
*H04W 72/04* (2009.01)
*H04W 4/70* (2018.01)
(Continued)

(52) U.S. Cl.
CPC ......... *H04W 72/042* (2013.01); *H04L 1/0061* (2013.01); *H04L 1/0067* (2013.01);
(Continued)

(58) Field of Classification Search
None
See application file for complete search history.

(56) References Cited

U.S. PATENT DOCUMENTS

| 2009/0257449 A1 | 10/2009 | Chen et al. |
| 2011/0122825 A1 | 5/2011 | Lee et al. |
| 2014/0064214 A1* | 3/2014 | Papasakellariou .... H04L 5/0053 370/329 |

FOREIGN PATENT DOCUMENTS

| EP | 2 547 017 A2 | 1/2013 |
| WO | 2011/046334 A2 | 4/2011 |

OTHER PUBLICATIONS

International Search Report dated Oct. 27, 2014, for corresponding International Application No. PCT/CN2014/071714, 2 pages.
(Continued)

*Primary Examiner* — Anh Ngoc Nguyen
(74) *Attorney, Agent, or Firm* — Seed IP Law Group LLP

(57) ABSTRACT

A method and device for transmitting data and a method and device for receiving data are provided. The method for transmitting data comprises: processing the data in at least five processes of cyclic redundancy check attachment, channel coding, rate matching, modulation and resource element mapping to generate a signal; and transmitting the signal in a plurality of subframes with a repetition level i, wherein the repetition level i is selected from a repetition level set including at least two different repetition levels, and for repetition level i, the data are transmitted in Ri subframes, and for different repetition levels, values of Ri are different, and wherein the data are processed by the five processes or
(Continued)

by the five processes and at least one additional process to generate different signals to be transmitted according to different repetition levels.

20 Claims, 13 Drawing Sheets

(51) Int. Cl.
H04L 1/00 (2006.01)
H04L 1/08 (2006.01)
H04W 4/00 (2018.01)
(52) U.S. Cl.
CPC .............. *H04L 1/0083* (2013.01); *H04L 1/08* (2013.01); *H04W 4/005* (2013.01); *H04W 4/70* (2018.02); *H04L 1/0071* (2013.01)

(56) References Cited

OTHER PUBLICATIONS

MediaTek Inc., "Discussion on PRACH and RACH procedure in coverage enhancement mode," R1-135424, 3GPP TSG-RAN WG1 #75, Agenda Item: 6.2.2.2.2, San Francisco, USA, Nov. 11-15, 2013, 5 pages.

* cited by examiner (a)

(b)

METHOD AND DEVICE FOR TRANSMITTING DATA AT DIFFERENT REPETITION LEVELS, AND METHOD AND DEVICE FOR RECEIVING DATA AT DIFFERENT REPETITION LEVELS

TECHNICAL FIELD

The present disclosure relates to the field of data transmission with multiple repetition levels in Machine-Type Communication.

BACKGROUND

MTC (Machine-Type Communication) is an important revenue stream for operators and has a huge potential from the operator perspective. Based on the market and operators' requirements, there are two requirements for MTC operation in LTE (Long Term Evolution). One is low-cost of MTC UEs (User Equipments) and communication; another is improving the coverage of MTC UEs, for example 15 dB coverage enhancement is required for MTC enhancement. To enhance the MTC coverage, almost each of the physical channels need to be enhanced including (E)PDCCH ((Enhanced) Physical downlink Control Channel). For example, coverage enhancement target for (E)PDCCH is 9.6 dB for FDD (Frequency-Division Duplex) and 14.6 dB for TDD (Time-Division Duplex).

For (E)PDCCH, repetition in time domain is the main method to improve the coverage. Based on simulation results presented in 3GPP (The 3rd Generation Partnership Project) meeting, hundreds of repetitions are needed for (E)PDCCH transmission. For example, for (E)PDCCH with the coverage enhancement target 9.6 dB as described above, approximately 100~200 repetitions are required. To satisfy multiple different coverage requirements, multiple repetition levels are supported and different repetition levels correspond to different integral (E)PDCCH repetition numbers. (E)PDCCH repetitions will be transmitted in multiple concentrated subframes. For each repetition level, integral (E)PDCCH repetitions transmit signals carrying one DCI (Downlink control information).

SUMMARY OF THE DISCLOSURE

In one aspect of the present disclosure, there is provided a method for transmitting data, comprising: processing the data in at least five processes of cyclic redundancy check attachment, channel coding, rate matching, modulation and resource element mapping to generate a signal; and transmitting the signal in a plurality of subframes with a repetition level i, wherein the repetition level i is selected from a repetition level set including at least two different repetition levels, and for repetition level i, the data are transmitted in Ri subframes, and for different repetition levels, values of Ri are different, and wherein the data are processed by the five processes or by the five processes and at least one additional process to generate different signals to be transmitted according to different repetition levels.

In another aspect of the present disclosure, there is provided a device for transmitting data, comprising: a processing unit configured to process the data in at least five processes of cyclic redundancy check attachment, channel coding, rate matching, modulation and resource element mapping to generate a signal; and a transmission unit configured to transmit the signal in a plurality of subframes with a repetition level i, wherein the repetition level i is selected from a repetition level set including at least two different repetition levels, and for repetition level i, the data are transmitted in Ri subframes, and for different repetition levels, values of Ri are different, and wherein the data are processed by the five processes or by the five processes and at least one additional process to generate different signals to be transmitted according to different repetition levels.

In a further aspect of the present disclosure, there is provided a method for receiving data, comprising: receiving a signal transmitted in a plurality of subframes with a repetition level i and obtaining the repetition level i based on the received signal, wherein the data are processed in at least five processes of cyclic redundancy check attachment, channel coding, rate matching, modulation and resource element mapping to generate the signal, wherein the repetition level i is selected from a repetition level set including at least two different repetition levels, and for repetition level i, the data are transmitted in Ri subframes, and for different repetition levels, values of Ri are different, and wherein the data are processed by the five processes or by the five processes and at least one additional process to generate different signals to be transmitted according to different repetition levels.

In another aspect of the present disclosure, there is provided a device for receiving data, comprising: a reception unit configured to receive a signal transmitted in a plurality of subframes with a repetition level i and to obtain the repetition level i based on the received signal, wherein the data are processed in at least five processes of cyclic redundancy check attachment, channel coding, rate matching, modulation and resource element mapping to generate the signal, wherein the repetition level i is selected from a repetition level set including at least two different repetition levels, and for repetition level i, the data are transmitted in Ri subframes, and for different repetition levels, values of Ri are different, and wherein the data are processed by the five processes or by the five processes and at least one additional process to generate different signals to be transmitted according to different repetition levels.

In the present disclosure, the data are processed by the five processes or by the five processes and at least one additional process to generate different signals to be transmitted according to different repetition levels, thereby the repetition level can be indicated implicitly without additional cost and accordingly the misunderstanding of the repetition level can be avoided.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
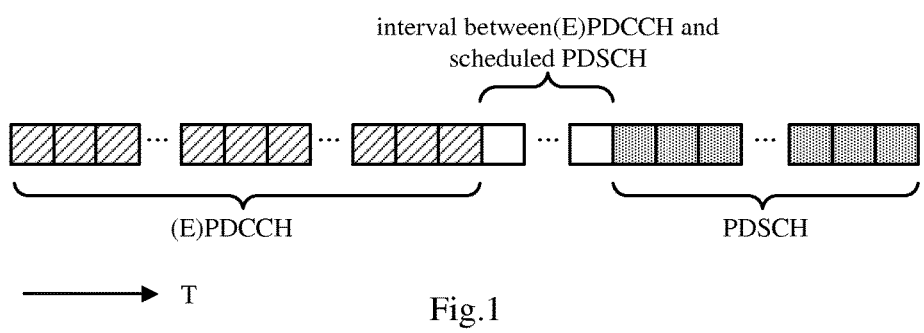
FIG. 1 is a schematic diagram showing an example of the timing relationship between (E)PDCCH and PDSCH.

In the following detailed description, reference is made to the accompanying drawings, which form a part hereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

MTC UEs or normal UEs in MTC mode need to receive the MTC (E)PDCCH repetitions and combine them to get the content of DCI. The PDSCH (Physical Downlink Shared Channel) scheduled by the MTC (E)PDCCH will be transmitted on the subframes after the subframes transmitting the MTC (E)PDCCH repetitions. To facilitate to determine when the scheduled PDSCH will be transmitted, the timing relationship between MTC (E)PDCCH and PDSCH is usually predefined. And, the starting subframe of PDSCH depends on the end of the (E)PDCCH. The timing relationship between (E)PDCCH and PDSCH is known by UE, and an example thereof is illustrated in FIG. 1.

FIG. 1 is a schematic diagram showing an example of the timing relationship between (E)PDCCH and PDSCH. As shown in FIG. 1, each box represents one subframe. Specifically, along the time axis, slash filled boxes represent subframes transmitting (E)PDCCH, and dot filled boxes represent subframes transmitting PDSCH. Blank boxes therebetween represents an interval of multiple subframes between (E)PDCCH and scheduled PDSCH. That is to say, PDSCH starts to be transmitted after the transmission of all the (E)PDCCH repetitions ends. And, the number of subframes between the last repetition of (E)PDCCH and the first repetition of PDSCH is usually known by UE for receiving and decoding the starting of PDSCH accurately.

However, in some cases, UE may decode the (E)PDCCH successfully with less repetitions than eNB (eNode B) transmits. If so, UE cannot know the exact end of integral (E)PDCCH repetitions, which may cause the UE misunderstand the starting subframe of scheduled PDSCH repetitions and cannot decode the PDSCH successfully.

Figure 2:
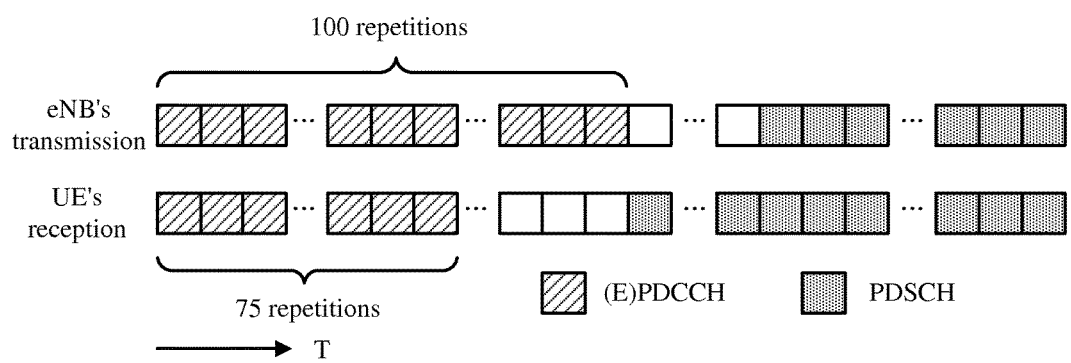
FIG. 2 is a schematic diagram showing an example of transmitting by eNB and receiving by UE (E)PDCCH and scheduled PDSCH.

FIG. 2 is a schematic diagram showing an example of transmitting by eNB and receiving by UE (E)PDCCH and scheduled PDSCH. Similarly with FIG. 1, in FIG. 2, each box represents one subframe. Specifically, along the time axis, slash filled boxes represent subframes transmitting (E)PDCCH, and dot filled boxes represent subframes transmitting PDSCH. Blank boxes therebetween represents an interval between (E)PDCCH and scheduled PDSCH. Also, the upper row corresponds to subframes transmitted by eNB while the lower row corresponds to subframes received by UE.

In FIG. 2, for example, eNB are going to transmit one (E)PDCCH 100 repetitions in 100 subframes as indicated in the upper row, while UE may successfully decode the (E)PDCCH when only 75 repetitions are received as indicated in the lower row. In this case, UE will start to receive the corresponding PDSCH when its known interval between (E)PDCCH and scheduled PDSCH ends after reception of 75 (E)PDCCH repetitions. However, actually the PDSCH is not transmitted from eNB yet at this time. Thus, the misunderstanding of repetition level (or repetition number, or subframe number) of (E)PDCCH occurs, and accordingly, UE cannot detect the scheduled PDSCH correctly.

Thus, repetition level ambiguity of MTC (E)PDCCH is a problem to be solved. A straightforward solution is that the repetition level of MTC (E)PDCCH is informed to UE directly, and accordingly, the UE can confirm the transmitting subframes of scheduled PDSCH. However, the straightforward solution needs additional signaling and the signaling should be received before PDSCH reception. In this case, the precondition of correctly decoding of PDSCH is correctly receiving of the signaling. This double-step PDSCH transmission scheme will impact the robustness of (E)PDCCH transmission. Thus, an approach capable of indicating the repetition level implicitly to UE without additional cost is desired.

Figure 3:
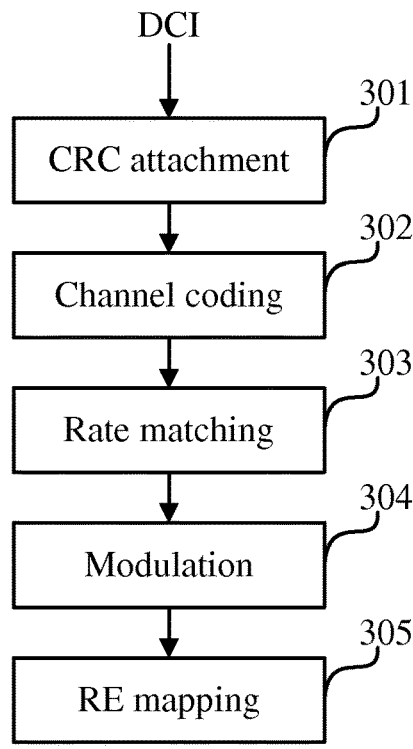
FIG. 3 is a schematic block diagram showing five processes for processing data needed to be transmitted.

For MTC (E)PDCCH, data needed to be transmitted (information bits or traffic data bits) usually need to be processed by at least five processes before being transmitted on a physical link. FIG. 3 is a schematic block diagram showing the five processes for processing data needed to be transmitted. In FIG. 3, DCI for MTC (E)PDCCH is taken as an example of the data needed to be transmitted here for only the purpose of explanation, and the present disclosure is not limited thereto.

As shown in FIG. 3, the five processes may include CRC (Cyclic Redundancy Check) attachment 301, channel coding 302, rate matching 303, modulation 304 and RE (Resource element) mapping 305. Specifically, at first, in the process of CRC attachment 301, DCI bits are performed CRC attachment, that is, are attached with CRC parity bits. Then, in the process of channel coding 302, DCI bits attached with CRC parity bits are performed channel coding based on specific transmission channel. Subsequently, in the process of rate matching 303, information bits obtained after channel coding are performed rate matching by using suitable coding rate to match with specific condition of transmission channel. Next, in the process of modulation 304, information bits obtained after rate matching is modulated into symbols. Finally, in the process of RE mapping 305, symbols obtained after modulation are mapped onto REs in a subframe. The details for general processing of respective processes 301~305 are well known for those skilled in the art and thus will not be further explained for avoiding redundancy.

Through the above five processes, data needed to be transmitted are finally mapped onto a subframe for further transmission. As described above, to improve the coverage for MTC (E)PDCCH, repetition is required. That is to say, after the five processes 301~305, repeated (E)PDCCH needs to be transmitted on multiple subframes. For example, symbols after repetition operation will be mapped onto multiple (e.g. 50) concentrated subframes after the process 305.

According to the present disclosure, to indicate the repetition level implicitly without additional cost, one or more other processes than the above five processes may be added additionally. And, for different repetition levels, at least one of the above five processes and the added processes is different. In the following, details thereof will be described in respective embodiments.

(First Embodiment)

Figure 4:
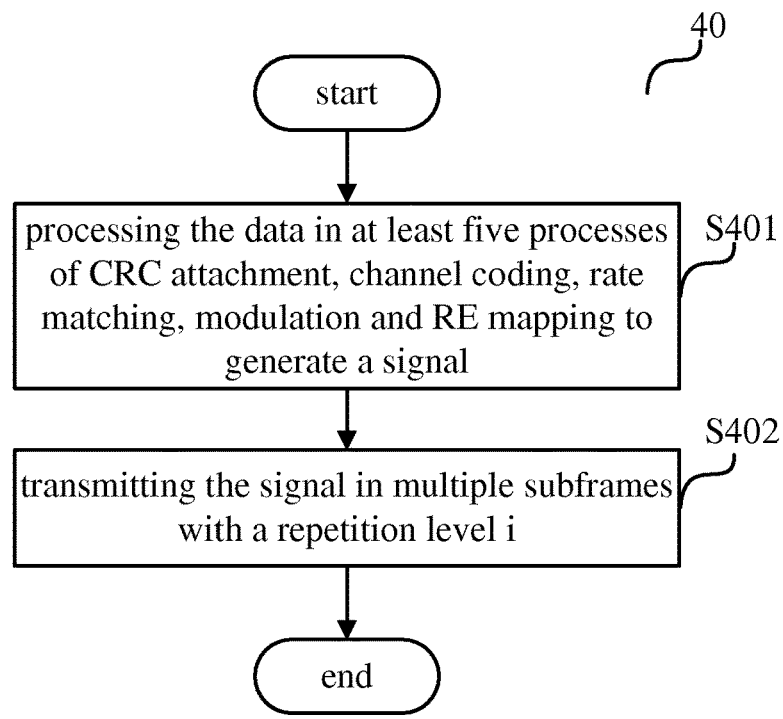
FIG. 4 is a flow chart of a method for transmitting data according to the first embodiment of the present disclosure.

FIG. 4 is a flow chart of a method 40 for transmitting data according to the first embodiment of the present disclosure. As shown in FIG. 4, the method 40 includes two steps S401 and S402. At the step S401, the data are processed in at least five processes of CRC attachment, channel coding, rate matching, modulation and RE mapping to generate a signal. Then, at the step S402, the signal is transmitted in multiple subframes with a repetition level i. The repetition level i is selected from a repetition level set including at least two different repetition levels, and for repetition level i, the data are transmitted in Ri subframes, and for different repetition levels, values of Ri are different. And, the data are processed by the five processes or by the five processes and at least one additional process to generate different signals to be transmitted according to different repetition levels.

Specifically, the five processes of CRC attachment, channel coding, rate matching, modulation and RE mapping in the step S401 are similar with those shown in FIG. 3. However, in the prior art method of processing the data, for different repetition levels, the processes 301~305 are generally same, which may cause misunderstanding the repletion level as described above. In the method 40, at least one of the five processes is different for different repetition levels, or one or more additional processes are added and at least one of the five processes and additional processes is different for different repetition levels. Thus, the repetition level can be indicated implicitly without additional cost and accordingly the misunderstanding of the repetition level can be avoided.

In the method 40, the data may be for example DCI for MTC (E)PDCCH as shown in FIG. 3, but the present disclosure is not limited thereto. Here, the data include control information bits such as DCI or traffic data bits. Also, the method 40 can be used for not only (E)PDCCH, but also PDSCH, PUSCH (Physical Uplink Shared Channel) and so on.

In the method 40, i represents repetition level number and may be an integer larger than 0, while Ri represents the number of subframes transmitting the data and may be an integer larger than 0. For example, there are two repetition levels, i.e. repetition level 1 and repetition level 2, and for repetition level 1, the data are transmitted in R1 (e.g. 50) subframes; while for repetition level 2, the data are transmitted in R2 (e.g. 100) subframes.

With the method 40, the data are processed by the five processes or by the five processes and at least one additional process to generate different signals to be transmitted according to different repetition levels, thereby the repetition level can be indicated implicitly without additional cost and accordingly the misunderstanding of the repetition level can be avoided.

In the following embodiments, specific processing of each of the five processes and additional processes will be described in detail. It is noted that DCI for MTC (E)PDCCH is also taken as an example for only the purpose of illustration in the following embodiments, however, the present disclosure is not limited thereto. Rather, all the embodiments of the present disclosure can be used for PDSCH, PUSCH and so on, either.

(Second Embodiment)

In the present embodiment, the method 40 as shown in FIG. 4 may further include a process of bit permutation after the process of CRC attachment and before the process of channel coding. And, in the process of bit permutation, bit permutation patterns are different for different repetition levels.

Figure 5:
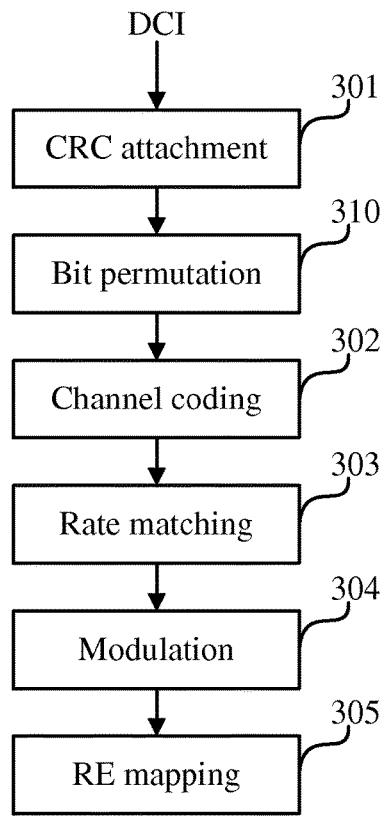
FIG. 5 is a schematic block diagram showing processes for processing the data according to the second embodiment of the present disclosure.
Figure 6:
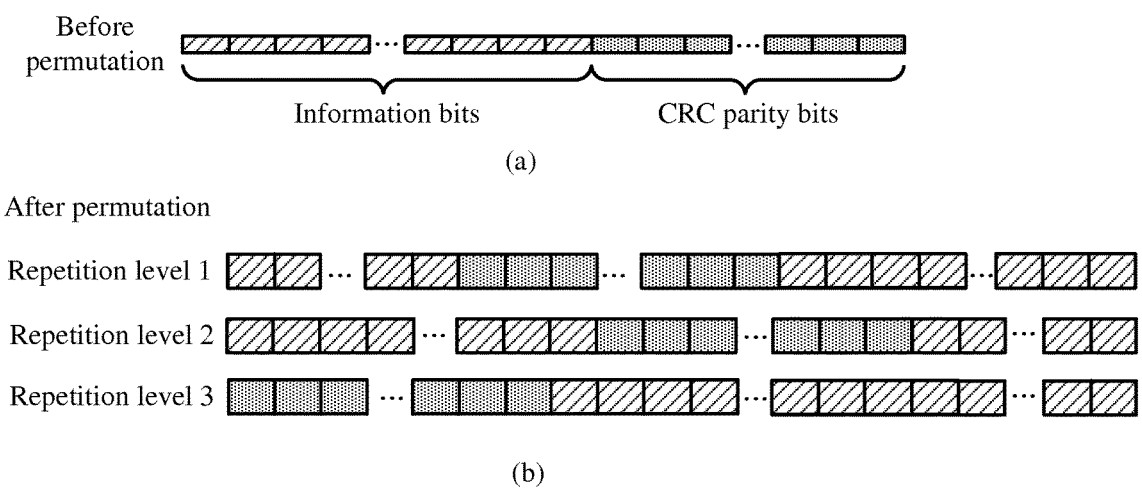
FIG. 6 is a schematic diagram showing an example of the process of bit permutation according to the second embodiment of the present disclosure.

FIG. 5 is a schematic block diagram showing processes for processing the data according to the second embodiment of the present disclosure. As compared with FIG. 3, in FIG. 5, the five processes 301~305 are unchanged, but a process of bit permutation 310 is newly added between the process of CRC attachment 301 and the process of channel coding 302. That is, DCI bits together with CRC parity bits obtained after the process 301 are additionally performed the processing of bit permutation. And, by using different bit permutation patterns according to different repetition levels in the process 310, repetition levels can be distinguished for the receiver side. FIG. 6 shows a typical example of the process 310.

FIG. 6 is a schematic diagram showing an example of the process of bit permutation 310 according to the second embodiment of the present disclosure. In FIG. 6, slash filled boxes represent information bits (DCI bits) while dot filled boxes represent CRC parity bits. FIG. 6(a) shows a case that DCI bits has been experienced the process of CRC attachment 301, but has not yet been experienced the process of bit permutation 310. Generally, in the process 301, CRC parity bits are calculated based on information bits and are attached to the end of information bits as shown in FIG. 6(a). In the prior art method of processing the data as shown in FIG. 3, the position of CRC parity bits is generally as shown in FIG. 6(a) and maintains unchanged for different repetition levels, which may cause misunderstanding the repetition level as described above.

In the present embodiment, information bits together with CRC parity bits obtained after the process 301 as shown in FIG. 6(a) will be further subject to the process of bit permutation 310 in which information bits together with CRC parity bits as shown in FIG. 6(a) will be performed bit permutation by using different bit permutation patterns according to different repetition levels. FIG. 6(b) further shows an exemplary case of after bit permutation 310 when there are for example three repetition levels, i.e. repetition level 1, repetition level 2 and repetition level 3. As shown in FIG. 6(b), for different repetition levels, the position of CRC parity bits as a whole is different after bit permutation 310. Subsequently, bit sequences obtained after the process of bit permutation 310 will be further subject to the process 302~305 and finally mapped onto subframes for transmission.

It is noted that, the bit permutation 310 is not limited to position adjustment of only CRC parity bits as a whole as shown in FIG. 6(b); rather, positions of any bits of information bits and CRC parity bits can be adjusted to form different bit permutation patterns according to different repetition levels.

In the present embodiment, by adding the process of bit permutation 310, the repetition levels can be distinguished by using different bit permutation patterns according to different repetition levels through simple and easy implementation without any impact on decoding complexity, thus the repetition level can be indicated implicitly without additional cost and accordingly the misunderstanding of the repetition level can be avoided.

(Third Embodiment)

According to the present embodiment, in the method 40 as shown in FIG. 4, coding rates are different for different repetition levels in the process of rate matching.

Figure 7:
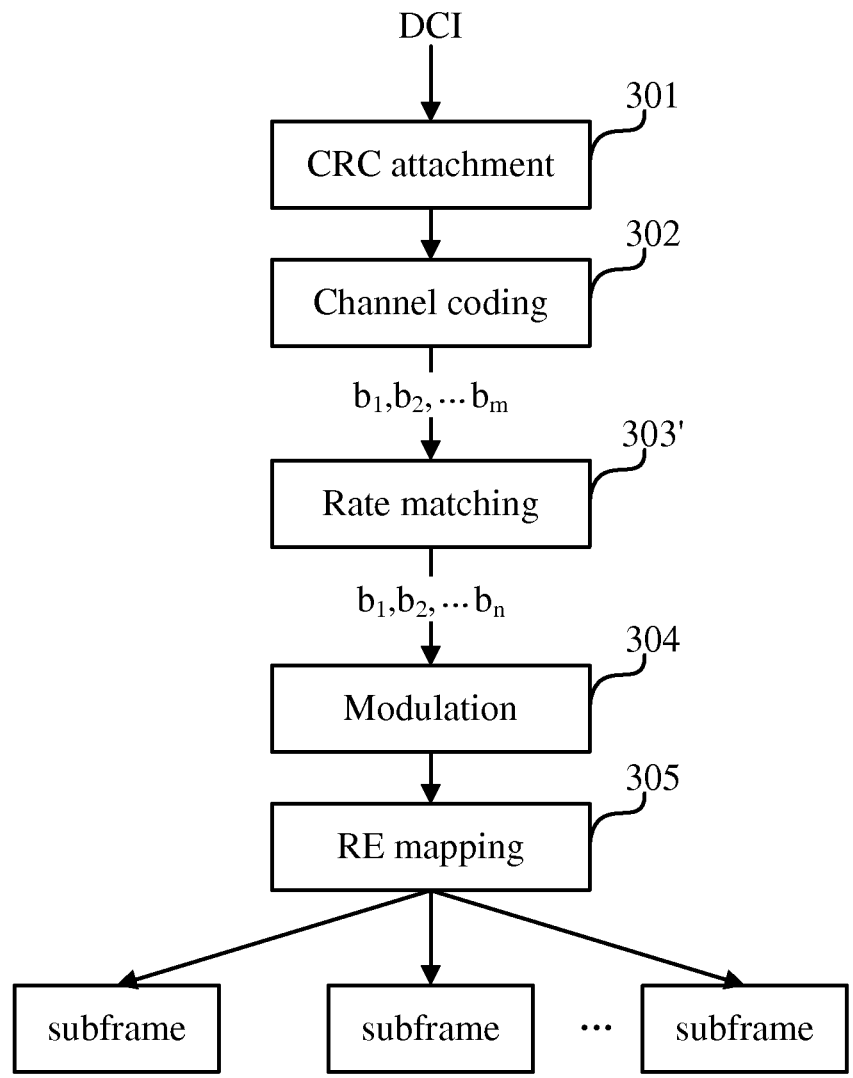
FIG. 7 is a schematic block diagram showing processes for processing the data according to the third embodiment of the present disclosure.

FIG. 7 is a schematic block diagram showing processes for processing the data according to the third embodiment of the present disclosure. As compared with FIG. 3, in FIG. 7, the four processes 301~302 and 304~305 are unchanged, but the process of rate matching 303 is replaced by a process of rate matching 303'. As described above with respect to FIG. 3, in the process of rate matching 303, a same coding rate is generally used for different repetition levels. However, in the process of rate matching 303, coding rates are different according to different repetition levels.

For example, it is assumed that a bit sequence of $b_1, b_2, \ldots, b_m$ is obtained after the process of channel coding 302 and that a bit sequence of $b_1, b_2, \ldots, b_n$ is obtained after the process of rate matching 303', as shown in FIG. 7. That is to say, the bit numbers before and after the process of rate matching 303' are respectively m and n. Specifically, taking a case that there are two repetition levels, i.e. repetition level 1 and repetition level 2, as an example, for repetition level 1, the data are transmitted on R1 subframes; while for repetition level 2, the data are transmitted on R2 subframes, in which it is assumed that R1>R2. In this case, to distinguish different repetition levels, in the process of rate matching 303', coding rate C1 is used for repetition level 1 while coding rate C2 is used for repetition level 2, in which C1<C2. Accordingly, for repetition level 1, the bit number after the rate matching 303' is n1; while for repetition level 2, the bit number after the rate matching 303' is n2, in which n1>n2. Subsequently, for repetition level 1, n1 bits are further processed in the processes 304 and 305 and finally mapped onto REs in M1 subframes; while for repetition level 2, n2 bits are processed in the processes 304 and 305 and finally mapped onto REs in M2 subframes, in which M1>M2.

In addition, $M1 \leq R1$ and $M2 \leq R2$. Specifically, taking repetition level 1 as an example, M1 subframes obtained after the process 305 may be repeated multiple times as a whole to form R1 subframes at last. Alternatively, when k1 repetitions of M1 subframes are enough for decoding the data successfully at the receiver side in which $k1*M1 \leq R1$, only a part of M1 subframes may be repeated into (R1−k1*M1) subframes subsequent to the k1*M1 subframes. The case of repetition level 2 is similar with it and will not be further described for avoiding redundancy.

Thus, in the present embodiment, by using different coding rates for different repetition levels in the process of rate matching 303', a same bit sequence before rate matching 303' is finally mapped onto different number of subframes according to different repletion levels. Thus, the repetition level can be indicated implicitly without additional cost and accordingly the misunderstanding of the repetition level can be avoided.

(Fourth Embodiment)

In the present embodiment, the method 40 as shown in FIG. 4 may further include two processes of repetition and bit permutation after the process of rate matching and before the process of modulation. And, in the process of repetition, m bits obtained after the process of rate matching are repeated into m*M bits in which M is no more than Ri, and in the process of bit permutation, bit permutation patterns are different for different repetition levels.

Figure 8:
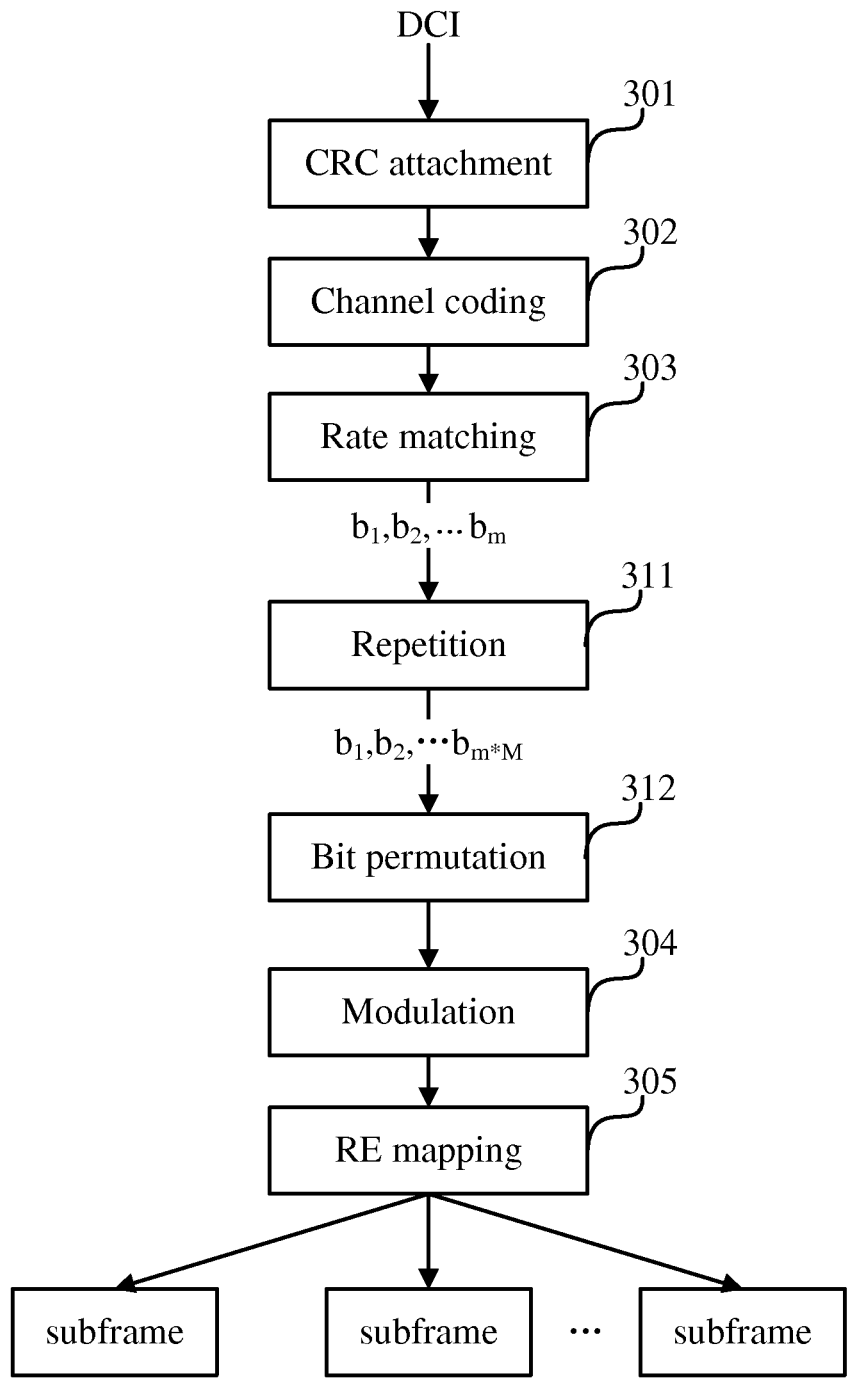
FIG. 8 is a schematic block diagram showing processes for processing the data according to the fourth embodiment of the present disclosure.
Figure 9:
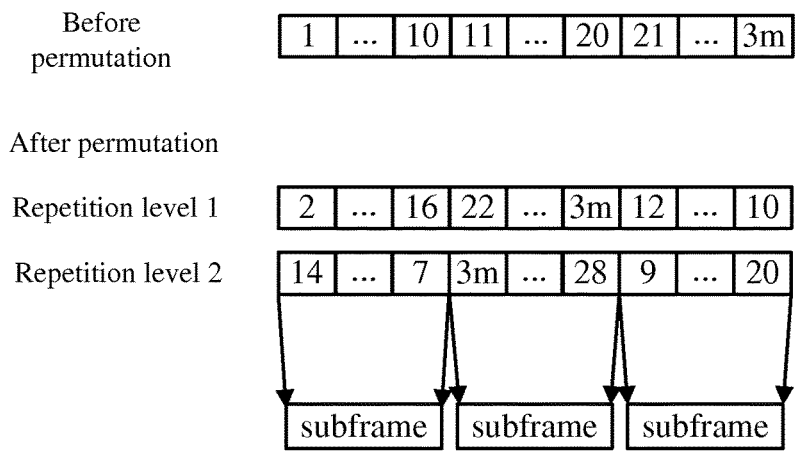
FIG. 9 is a schematic diagram showing an example of the processes of repetition 311 and bit permutation 312 according to the fourth embodiment of the present disclosure.

FIG. 8 is a schematic block diagram showing processes for processing the data according to the fourth embodiment of the present disclosure. As compared with FIG. 3, in FIG. 8, the five processes 301~305 are unchanged, but two processes of repetition 311 and bit permutation 312 are newly added between the process of rate matching 303 and the process of modulation 304. Specifically, as shown in FIG. 8, it is assumed that a bit sequence of $b_1, b_2, \ldots, b_m$ is obtained after the process of rate matching 303, and these m bits $b_1, b_2, \ldots, b_m$ are repeated into m*M bits $b_1, b_2, \ldots, b_{m*M}$ in the process of repetition 311. Then, these m*M bits are further performed the processing of bit permutation in the process of bit permutation 312 which is similar with the process of bit permutation 310 in the second embodiment. That is, in the process of bit permutation 312, different bit permutation patterns are used according to different repetition levels. Subsequently, these m*M bits after bit permutation are further subject to the processes 304 and 305 and finally mapped onto M subframes. FIG. 9 shows a typical example of the processes 311 and 312.

FIG. 9 is a schematic diagram showing an example of the processes of repetition 311 and bit permutation 312 according to the fourth embodiment of the present disclosure. For the convenience of illustration, it is assumed that M=3. In this case, 3 m bits $b_1, b_2, \ldots, b_{3m}$ are obtained after the process of repetition 311 and before the process of bit permutation 312, as shown in the first row of boxes in which the number in each box represents bit index. Next, in the process of bit permutation 312, these 3 m bits are performed the processing of bit permutation by using different bit permutation patterns according to different repetition levels. The second row of boxes and the third row of boxes in FIG. 9 shows an exemplary case of after bit permutation 312 when there are for example two repetition levels, i.e. repetition level 1 and repetition level 2. As shown in FIG. 9, after bit permutation 312, the arrangement order of bit indexes is changed from that shown in the first row of boxes, and the arrangement order of bit indexes for repetition level 1 as shown in the second row of boxes is different from that for repetition level 2 as shown in the third row of boxes. Finally, for both repetition level 1 and repetition level 2, their 3 m bits with different bit permutation patterns are respectively mapped onto 3 subframes as shown in FIG. 9.

It is noted that, similarly with the process of bit permutation 310 in the second embodiment, positions of any bits of bit sequence obtained after the process of repetition 311 can be adjusted to form different bit permutation patterns according to different repetition levels.

In addition, similarly with the third embodiment, $M \leq Ri$ here. Specifically, M subframes obtained after the process 305 may be repeated multiple times as a whole to form Ri subframes at last. Alternatively, when k repetitions of M subframes are enough for decoding the data successfully at the receiver side in which $k*M \leq Ri$, only a part of M subframes may be repeated into (Ri-k*M) subframes subsequent to the k*M subframes.

Alternatively, according to the present disclosure, in the process of repetition 311, values of M may be different for different repetition levels.

Although FIG. 9 only illustrates a case that m bits are repeated into m*M bits for both repetition level 1 and repetition level 2 in the repetition 311, the present disclosure is not limited thereto. Rather, values of M may be different for different repletion levels. For example, for repetition level 1, m bits may be repeated into m*M1 bits; while for repetition level 2, m bits may be repeated into m*M2 bits, in which M1 is unequal to M2.

Figure 10:
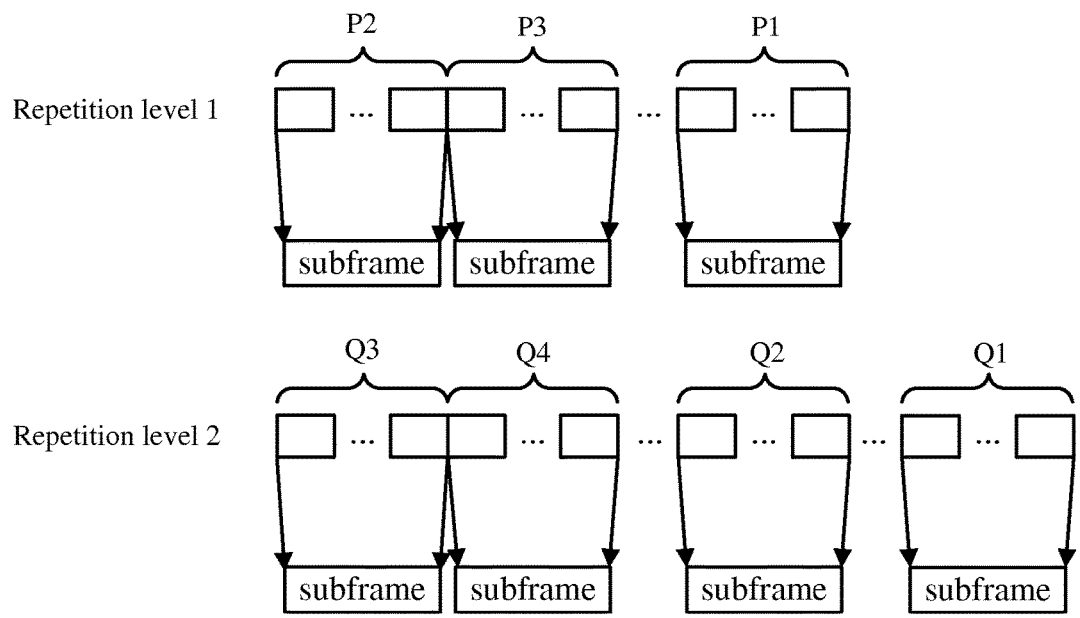
FIG. 10 is a schematic diagram showing another example of the processes of repetition 311 and bit permutation 312 according to the fourth embodiment of the present disclosure.

Accordingly, for repetition level 1, m*M1 bits are finally mapped onto M1 subframes; while for repetition level 2, m*M2 bits are finally mapped onto M2 subframes. FIG. 10 shows an example of the processes 311 and 312 when values of M are different for different repetition levels.

FIG. 10 is a schematic diagram showing another example of the processes of repetition 311 and bit permutation 312 according to the fourth embodiment of the present disclosure. In FIG. 10, it is assumed that M1=3 and M2=4 for example. That is, in the process of repetition 311, for repetition level 1, m bits are repeated into 3 m bits; while for repetition level 2, m bits are repeated into 4 m bits. Then, in the process of bit permutation 312, 3 m bits for repetition level 1 and 4 m bits for repetition level 2 are performed bit permutation using different bit permutation patterns respectively. Finally, as shown in FIG. 10, for repetition level 1, 3 m bits after bit permutation as indicated by three parts P1~P3 are mapped onto 3 subframes; while for repetition level 2, 4 m bits after bit permutation as indicated by four parts Q1~Q4 are mapped onto 4 subframes. Since in the case where values of M are different for different repetition levels, processing of bit permutation is similar with that in the case where M is unchanged for different repetition levels as shown in FIG. 9, details of bit permutation are not illustrated in FIG. 10.

In the present embodiment, by adding the processes of repetition 311 and bit permutation 312, the repetition levels can be distinguished by repeating bits obtained after rate matching and permutating the repeated bits using different bit permutation patterns according to different repetition levels, thus the repetition level can be indicated implicitly without additional cost and accordingly the misunderstanding of the repetition level can be avoided.

(Fifth Embodiment)

In the present embodiment, the method 40 as shown in FIG. 4 may further include a process of symbol permutation after the process of modulation and before the process of RE mapping. And, in the process of symbol permutation, symbol permutation patterns are different for different repetition levels, and symbols after the process of symbol permutation are mapped onto one subframe.

Figure 11:
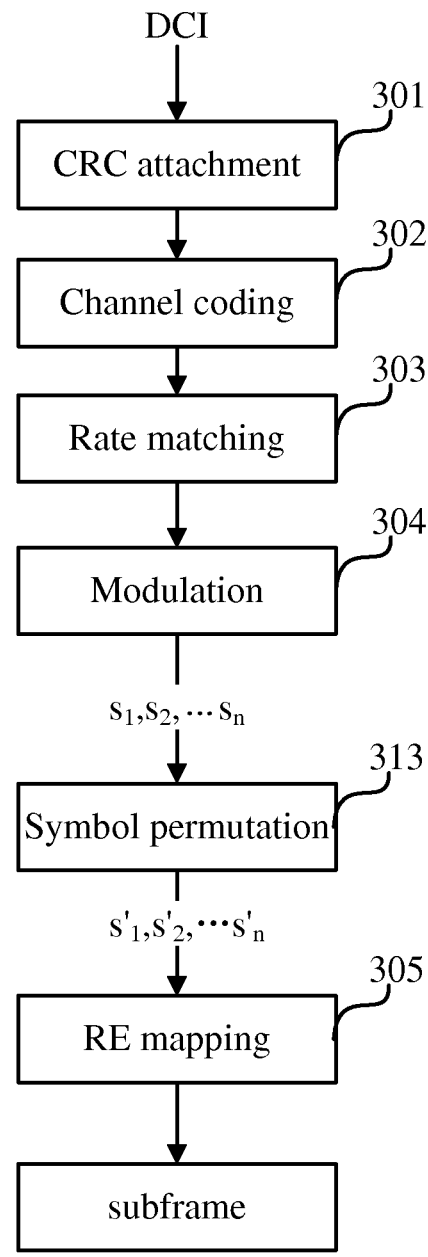
FIG. 11 is a schematic block diagram showing processes for processing the data according to the fifth embodiment of the present disclosure.

FIG. 11 is a schematic block diagram showing processes for processing the data according to the fifth embodiment of the present disclosure. As compared with FIG. 3, in FIG. 11, the five processes 301~305 are unchanged, but a process of symbol permutation 313 is newly added between the process of modulation 304 and the process of RE mapping 305. Specifically, as shown in FIG. 11, n symbols $s_1, s_2, \ldots, s_n$ obtained after the process 304 are permutated into n symbols $s'_1, s'_2, \ldots, s'_n$ in the process of symbol permutation 313. Subsequently, n symbols $s'_1, s'_2, \ldots, s'_n$ are mapped onto REs in one subframe by the process of RE mapping 305 as shown in FIG. 11. Further, in the process of symbol permutation 313, these n symbols $s_1, s_2, \ldots, s_n$ corresponding to one subframe are performed symbol permutation using different symbol permutation patterns according to different repetition levels, thus repetition levels can be distinguished for the receiver side.

Although objects to be processed are different, the principles of symbol permutation and bit permutation are same. Thus, no specific example of symbol permutation 313 is further given here for avoiding redundancy.

In the present embodiment, by adding the process of symbol permutation 313, the repetition levels can be distinguished by using different symbol permutation patterns according to different repetition levels through simple and easy implementation without any impact on decoding complexity, thus the repetition level can be indicated implicitly without additional cost and accordingly the misunderstanding of the repetition level can be avoided.

(Sixth Embodiment)

In the present embodiment, the method 40 as shown in FIG. 4 may further include a process of repetition after the process of modulation and before the process of symbol permutation. And, in the process of repetition, n symbols obtained after the process of modulation are repeated into n*N symbols in which N is no more than Ri, and the n*N symbols are mapped onto N subframes.

Figure 12:
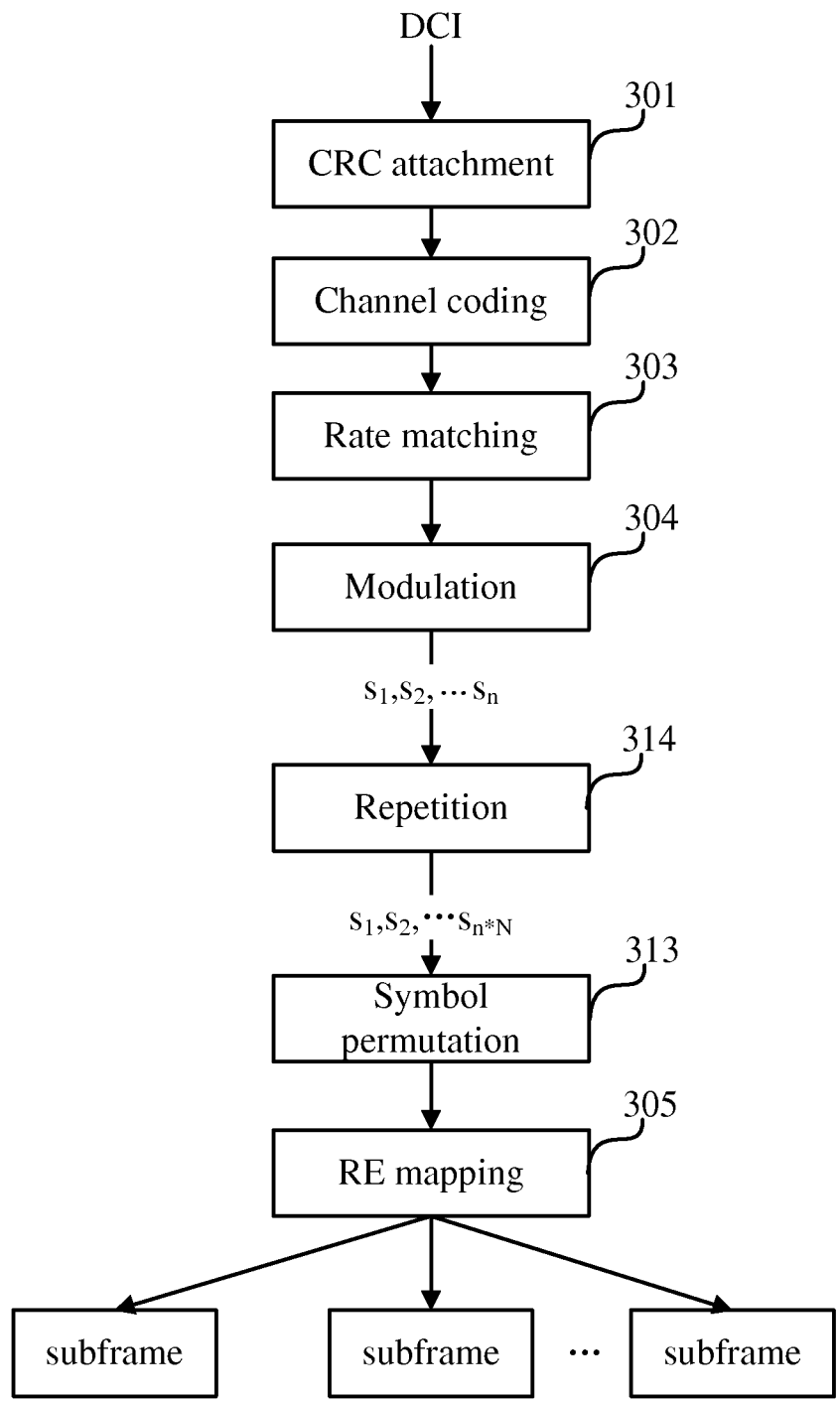
FIG. 12 is a schematic block diagram showing processes for processing the data according to the sixth embodiment of the present disclosure.

FIG. 12 is a schematic block diagram showing processes for processing the data according to the sixth embodiment of the present disclosure. As compared with FIG. 11, in FIG. 12, the five processes 301~305 and the process of symbol permutation 313 are unchanged, but a process of repetition 314 is newly added between the process of modulation 304 and the process of symbol permutation 313. Specifically, as shown in FIG. 11, n symbols $s_1, s_2, \ldots, s_n$ obtained after the process of modulation 304 are repeated into n*N symbols $s_1, s_2, \ldots, s_{n*N}$ in the process of repetition 314. Then, these n*N symbols $s_1, s_2, \ldots, s_{n*N}$ are performed symbol permutation by using different symbol permutation patterns for different repetition levels in the process of symbol permutation 313. Finally, n*N symbols after symbol permutation are mapped onto N subframes by the process of RE mapping 305 as shown in FIG. 12.

In FIG. 11, n symbols which are finally mapped onto one subframe are performed the symbol permutation. In FIG. 12, n*N symbols which are finally mapped onto N subframes are performed the symbol permutation. Thus, it can be seen that the symbol permutation may happens within symbols which are finally mapped onto one subframe or may be happens within symbols which are finally mapped onto more than one subframes.

In addition, similarly with the fourth embodiment, N≤Ri here for the case of FIG. 12. Specifically, N subframes obtained after the process 305 may be repeated multiple times as a whole to form Ri subframes at last. Alternatively, when k repetitions of N subframes are enough for decoding the data successfully at the receiver side in which k*N≤Ri, only a part of N subframes may be repeated into (Ri−k*N) subframes subsequent to the k*N subframes.

Alternatively, according to the present disclosure, in the process of repetition 314, values of N may be different for different repetition levels.

Although objects to be processed are different, the principles of repetition 314 and repetition 311 are the same. Thus, similarly with repetition 311, in the process of repetition 314, values of N may be different for different repetition levels. For example, for repetition level 1, n symbols may be repeated into n*N1 symbols; while for repetition level 2, n symbols may be repeated into n*N2 symbols, in which N1 is unequal to N2. Accordingly, for repetition level 1, n*N1 symbols are finally mapped onto N1 subframes; while for repetition level 2, n*N2 symbols are finally mapped onto N2 subframes. Since the principle of repetition 314 is similar with that of repetition 311, no specific example of repetition 314 is further given here for avoiding redundancy.

In the present embodiment, by adding the processes of repetition 314 and symbol permutation 313, the repetition levels can be distinguished by repeating symbols obtained after modulation and permutating the repeated symbols using different symbol permutation patterns according to different repetition levels, thus the repetition level can be indicated implicitly without additional cost and accordingly the misunderstanding of the repetition level can be avoided.

(Seventh Embodiment)

In the present embodiment, the method 40 as shown in FIG. 4 may further include a process of repetition after the process of modulation and before the process of RE mapping. And, in the process of repetition, n symbols obtained after the process of modulation are repeated into n*N symbols in which N is no more than Ri, and values of N are different for different repetition levels, and in the process of RE mapping, n*N symbols are mapped onto N subframes in the increasing order of first time domain and then frequency domain.

Figure 13:
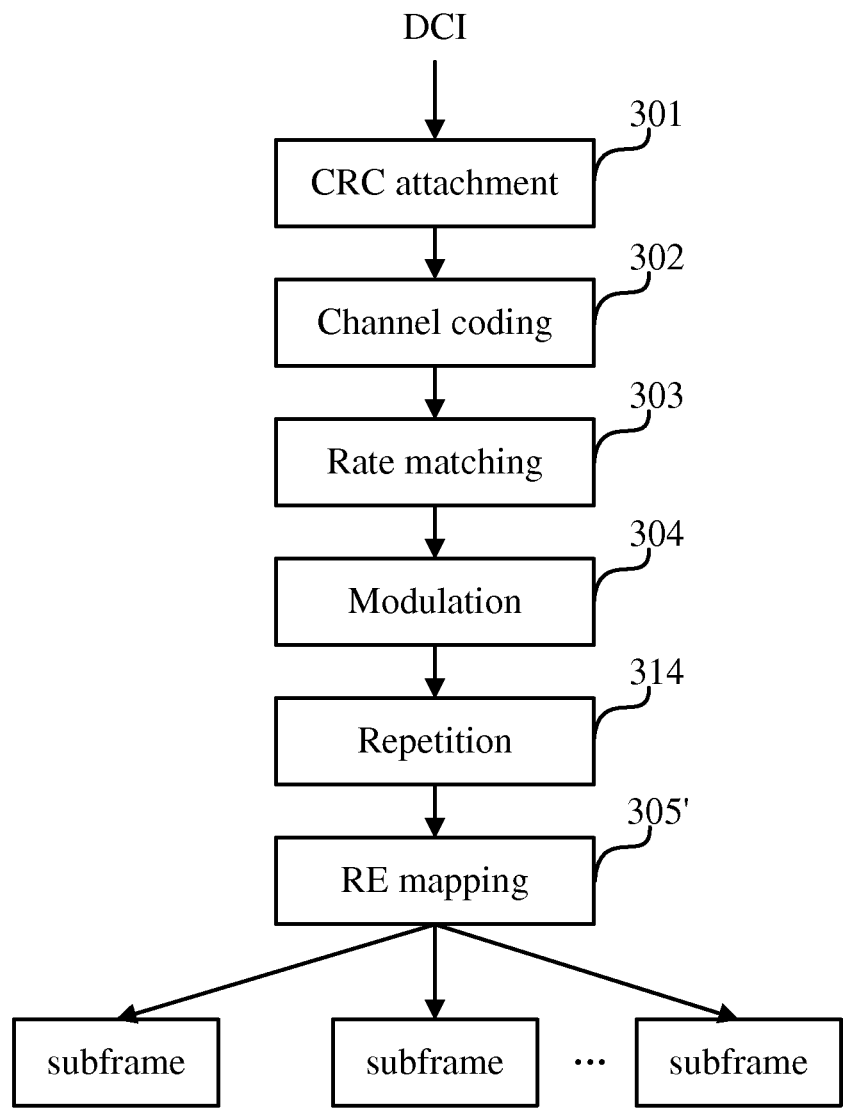
FIG. 13 is a schematic block diagram showing processes for processing the data according to the seventh embodiment of the present disclosure.

FIG. 13 is a schematic block diagram showing processes for processing the data according to the seventh embodiment of the present disclosure. As compared with FIG. 12, in FIG. 13, the four processes 301~304 and the process of repetition 314 are unchanged, but the process of symbol permutation 313 is removed and the process of RE mapping 305 is replaced by a process of RE mapping 305'. Specifically, as described in the sixth embodiment, in the process of repetition 314, n symbols obtained after the process of modulation 304 are repeated into n*N symbols, and values of N are different for different repetition levels. For example, for repetition level 1, n symbols may be repeated into n*N1 symbols; while for repetition level 2, n symbols may be repeated into n*N2 symbols, in which N1 is unequal to N2. Then, as shown in FIG. 13, these n*N symbols obtained after repetition 314 are no longer permutated and directly mapped onto REs in N subframes by the process of RE mapping 305'.

Figure 14:
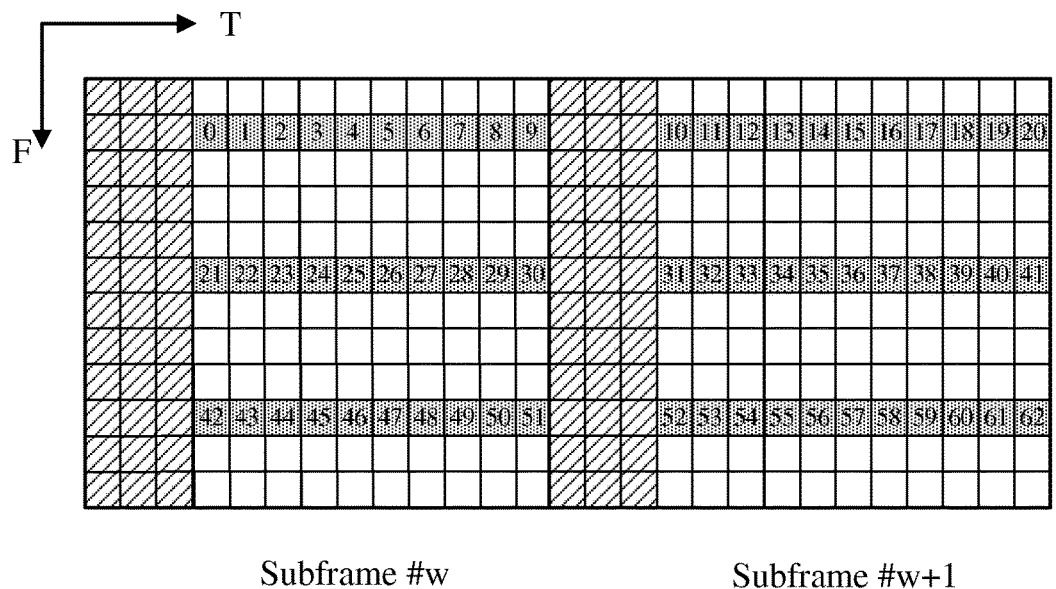
FIG. 14 is a schematic diagram showing an example of the processes of RE mapping 305' according to the seventh embodiment of the present disclosure.

Differently from the process of RE mapping 305 as shown in FIG. 3, in the process of RE mapping 305', n*N symbols are mapped onto N subframes in the increasing order of first time domain and then frequency domain. FIG. 14 shows an example of the process of RE mapping 305'.

FIG. 14 is a schematic diagram showing an example of the processes of RE mapping 305' according to the seventh embodiment of the present disclosure. For convenience of illustration, FIG. 14 shows a case that N=2 for example. That is, repeated symbols after the process of repetition 314 are mapped onto REs in 2 subframes in the process of RE mapping 305'. In FIG. 14, two adjacent subframes, i.e. subframe #w and subframe #w+1, are illustrated exemplarily. The horizontal axis represents time axis and the vertical axis represents frequency axis. And, dot filled boxes represent REs where repeated symbols are mapped, in which each number represents symbol index. It can be seen from FIG. 14 that the mapping order of repeated symbols is that the repeated symbols are sequentially mapped onto REs in 2 subframes as a whole along first the time axis and then frequency axis, that is, in the increasing order of first time domain and then frequency domain. Thus, when only one of 2 subframes is decoded by the receiver side, the data cannot be decoded completely and successfully. Rather, the data can be decoded completely and successfully only if both of 2 subframes are decoded at the receiver side. For the case of two repetition levels, N1 subframes need to be decoded together for repetition level 1, while N2 subframes need to be decoded together for repetition level 2. Thereby, repetition levels can be distinguished at the receiver side.

In addition, similarly with the fourth and sixth embodiments, N≤Ri here for the case of FIG. 13. Specifically, N subframes obtained after the process 305' may be repeated multiple times as a whole to form Ri subframes at last. Alternatively, when k repetitions of N subframes are enough for decoding the data successfully at the receiver side in which k*N≤Ri, only a part of N subframes may be repeated into (Ri−k*N) subframes subsequent to the k*N subframes.

In the present embodiment, by adding the processes of repetition 314 and mapping repeated symbols onto subframes in the increasing order of first time domain and then frequency domain in the process of RE mapping 305', the repetition level can be indicated implicitly without additional cost and accordingly the misunderstanding of the repetition level can be avoided.

(Eighth Embodiment)

According to the present embodiment, in the method 40 as shown in FIG. 4, symbols obtained after the process of modulation are mapped onto different REs in one subframe for different repetition levels in the process of RE mapping.

Figure 15:
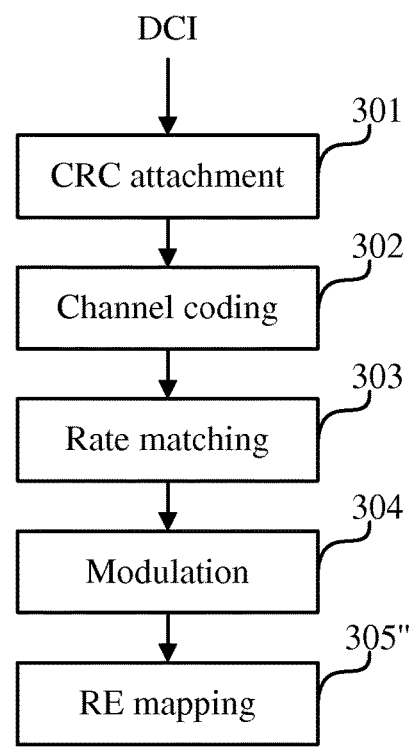
FIG. 15 is a schematic block diagram showing processes for processing the data according to the eighth embodiment of the present disclosure.

FIG. 15 is a schematic block diagram showing processes for processing the data according to the eighth embodiment of the present disclosure. As compared with FIG. 3, in FIG. 15, the four processes 301~304 are unchanged, but the process of RE mapping 305 is replaced by a process of RE mapping 305". As described above with respect to FIG. 3, in the process of RE mapping 305, for different repetition levels, a same manner of RE mapping is generally employed, that is, symbols are usually mapped onto same REs in one subframe. However, in the process of RE mapping 305", symbols obtained after the process of modulation are mapped onto different REs in one subframe for different repetition levels.

Specifically, in each subframe, one (E)PDCCH repetition is transmitted. For example, it is assumed that there are L (E)CCE ((Enhanced) Control Channel Element) subsets in one subframe, in which L is an integer larger than 0. And, in each of the L subsets, one (E)PDCCH repetition can be transmitted. Taking a case of two repetition levels as an example, for repetition level 1, the (E)PDCCH is mapped onto #I1 (E)CCE subset in one subframe; while for repetition level 2, the (E)PDCCH is mapped onto #I2 (E)CCE subset in one subframe, in which #I1 and #I2 represent subset indexes for different two (E)CCE subsets among the L (E)CCE subsets.

Thus, in the present embodiment, by mapping symbols obtained after the process of modulation onto different REs in one subframe for different repetition levels in the process of RE mapping 305", the repetition level can be indicated implicitly without additional cost and accordingly the misunderstanding of the repetition level can be avoided.

(Ninth Embodiment)

According to the present embodiment, in the method 40 as shown in FIG. 4, the processing of the CRC bits attaching is different for different repetition levels in the process of CRC attachment.

Figure 16:
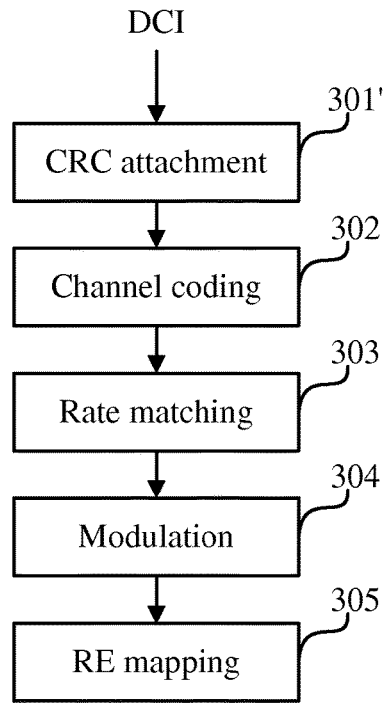
FIG. 16 is a schematic block diagram showing processes for processing the data according to the ninth embodiment of the present disclosure.
Figure 17:
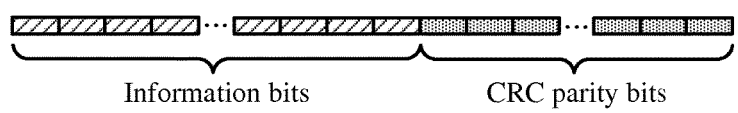
FIG. 17 is a schematic diagram showing an example of the process of CRC attachment 301' according to the ninth embodiment of the present disclosure.
Figure 17:
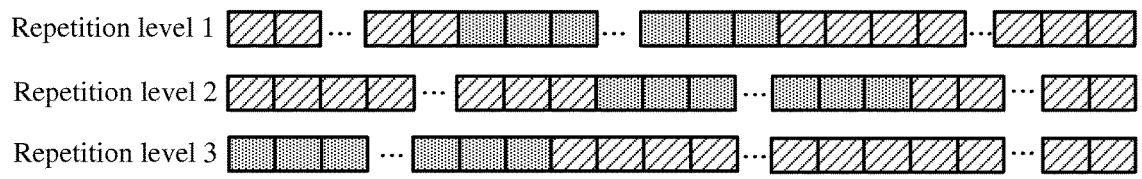

FIG. 16 is a schematic block diagram showing processes for processing the data according to the ninth embodiment of the present disclosure. As compared with FIG. 3, in FIG. 16, the four processes 302~305 are unchanged, but the process of CRC attachment 301 is replaced by a process of CRC attachment 301'. As described above with respect to FIG. 3, in the process of CRC attachment 301, for different repetition levels, the processing of the CRC bits attaching is usually same, that is, the bit sequence and position of CRC parity bits are same. However, in the process of CRC attachment 301', the processing of the CRC bits attaching is different for different repetition levels. FIG. 17 shows an example of the process of CRC attachment 301'.

FIG. 17 is a schematic diagram showing an example of the process of CRC attachment 301' according to the ninth embodiment of the present disclosure. In FIG. 17, slash filled boxes represent information bits (DCI bits) while dot filled boxes represent CRC parity bits. For the convenience of comparison, FIG. 17(a) shows a case of the process of CRC attachment 301. Generally, as shown in FIG. 17(a), in the process 301, CRC parity bits are calculated based on information bits and are attached to the end of information bits no matter whether different repetition levels are used, which may cause misunderstanding the repetition level as described above. FIG. 17(b) further shows an exemplary case of CRC attachment 301' when there are for example three repetition levels, i.e. repetition level 1, repetition level 2 and repetition level 3. As shown in FIG. 17(b), for different repetition levels, the position of CRC parity bits as a whole is different so as to distinguish repetition levels.

It is not difficult to find that the result of the process of CRC attachment 301' as shown in FIG. 17(b) is same with that of the processes of CRC attachment 301 and bit permutation 310 as shown in FIG. 6(b). It means that by adjusting the position of the whole CRC parity bits in the process of CRC attachment 301' according to different repetition levels or by attaching CRC parity bits to the end of DCI bits as usual in the process of CRC attachment 301 and then permutating DCI bits together with CRC parity bits using different bit permutation patterns according to different repetition levels, the same effect of distinguishing repetition levels can be achieved.

FIG. 17(b) only illustrate one manner of CRC bits attaching in the process of CRC attachment 301', and the present disclosure is not limited thereto. Other than the position of CRC parity bits, the bit sequence thereof may be different according to different repetition levels. For example, for repetition level 1, the CRC parity bits may be 11011011; while for repetition level 2, the CRC parity bits may be 11000100.

Thus, in the present embodiment, since the processing of the CRC bits attaching is different for different repetition levels in the process of CRC attachment, the repetition level can be indicated implicitly without additional cost and accordingly the misunderstanding of the repetition level can be avoided.

(Tenth Embodiment)

Alternatively, according to the present disclosure, in the method 40 as shown in FIG. 4, the processing of the channel coding may be different for different repetition levels in the process of channel coding. Although not shown in figure, the process of channel coding 302 in FIG. 3 may also be replaced by a process of channel coding 301' in which the processing of the channel coding is different according to different repetition levels, so that the repetition level can be indicated implicitly without additional cost and accordingly the misunderstanding of the repetition level can be avoided.

Alternatively, according to the present disclosure, in the method 40 as shown in FIG. 4, different modulation schemes may be used for different repetition levels in the process of modulation. Although not shown in figure, the process of modulation 304 in FIG. 3 may also be replaced by a process of modulation 304' in which different modulation schemes are used according to different repetition levels, so that the repetition level can be indicated implicitly without additional cost and accordingly the misunderstanding of the repetition level can be avoided.

In addition, it is illustrated in the above embodiments that in one of the five processes of CRC attachment, channel coding, rate matching, modulation and RE mapping as well as at least one additional process, by processing differently the data according to different repetition levels, the repetition level can be indicated implicitly without additional cost and accordingly the misunderstanding of the repetition level can be avoided. However, the present disclosure is not limited thereto, and any combination of the above embodiments, that is, any combination of the above processing of the above processes, may also indicate implicitly the repetition level without additional cost and accordingly avoid the misunderstanding of the repetition level.

(Eleventh Embodiment)

Figure 18:
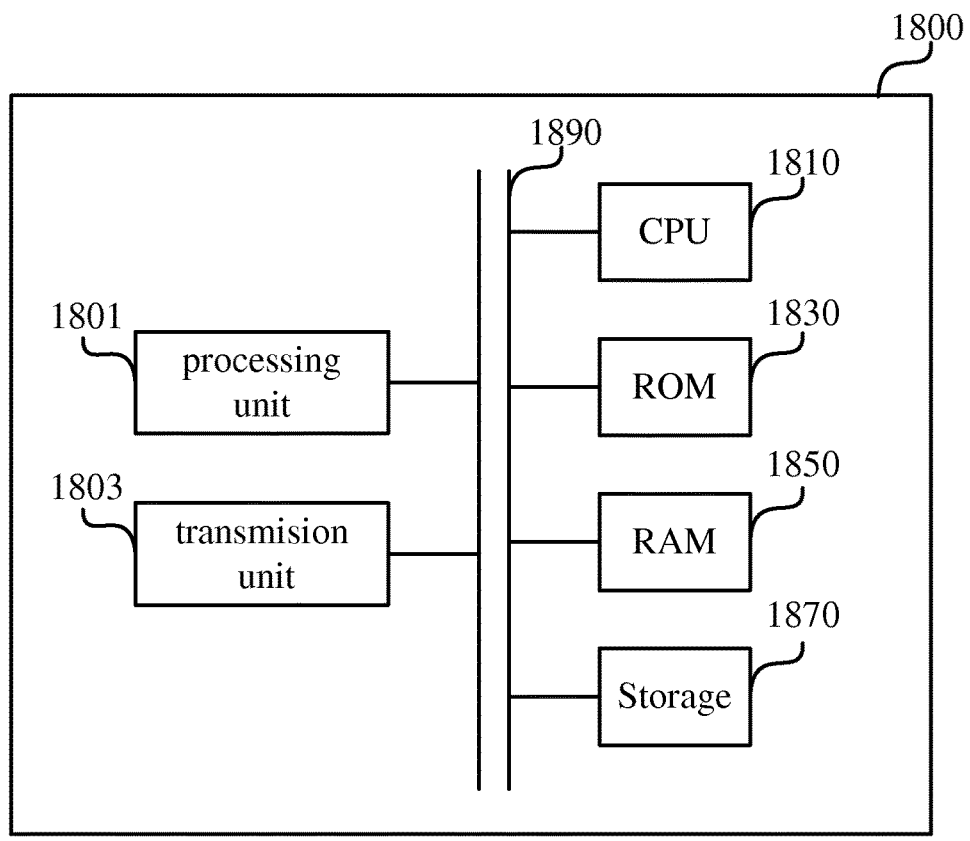
FIG. 18 is a block diagram showing a device for transmitting data according to the eleventh embodiment of the present disclosure.

FIG. 18 is a block diagram showing a device 1800 for transmitting data according to the eleventh embodiment of the present disclosure. As shown in FIG. 18, the device 1800 for transmitting data includes: a processing unit 1801 configured to process the data in at least five processes of CRC attachment, channel coding, rate matching, modulation and RE mapping to generate a signal; and a transmission unit 1803 configured to transmit the signal in multiple subframes with a repetition level i. The repetition level i is selected from a repetition level set including at least two different repetition levels, and for repetition level i, the data are transmitted in Ri subframes, and for different repetition levels, values of Ri are different. And, the data are processed by the five processes or by the five processes and at least one additional process to generate different signals to be transmitted according to different repetition levels.

The device 1800 for transmitting data according to the present embodiment may further include a CPU (Central Processing Unit) 1810 for executing related programs to process various data and control operations of respective units in the device 1800, a ROM (Read Only Memory) 1830 for storing various programs required for performing various process and control by the CPU 1810, a RAM (Random Access Memory) 1850 for storing intermediate data temporarily produced in the procedure of process and control by the CPU 1810, and/or a storage unit 1870 for storing various programs, data and so on. The above processing unit 1801, transmission unit 1803, CPU 1810, ROM 1830, RAM 1850 and/or storage unit 1870 etc. may be interconnected via data and/or command bus 1890 and transfer signals between one another.

Respective units as described above do not limit the scope of the present disclosure. According to one embodiment of the disclosure, the function of any of the above processing unit 1801 and transmission unit 1803 may also be implemented by functional software in combination with the above CPU 1810, ROM 1830, RAM 1850 and/or storage unit 1870 etc.

According to the present embodiment, in the device 1800, the processing unit 1801 may further includes a process of bit permutation after the process of CRC attachment and before the process of channel coding. And, in the process of bit permutation, bit permutation patterns are different for different repetition levels.

According to the present embodiment, in the device 1800, coding rates may be different for different repetition levels in the process of rate matching.

According to the present embodiment, in the device 1800, the processing unit 1801 may further includes two processes of repetition and bit permutation after the process of rate matching and before the process of modulation. In the process of repetition, m bits obtained after the process of rate matching are repeated into m*M bits in which M is no more than Ri. And, in the process of bit permutation, bit permutation patterns are different for different repetition levels.

According to the present embodiment, in the device 1800, the processing unit 1801 may further includes a process of symbol permutation after the process of modulation and before the process of RE mapping. And, in the process of symbol permutation, symbol permutation patterns are different for different repetition levels.

According to the present embodiment, in the device 1800, the processing unit 1801 may further includes a process of repetition after the process of symbol permutation and before the process of symbol permutation. And, in the process of repetition, n symbols obtained after the process of modulation are repeated into n*N symbols in which N is no more than Ri.

According to the present embodiment, in the device 1800, the processing unit 1801 may further includes a process of repetition after the process of modulation and before the process of RE mapping. In the process of repetition, n symbols obtained after the process of modulation are repeated into n*N symbols in which N is no more than Ri, and values of N are different for different repetition levels. And, in the process of RE mapping, n*N symbols are mapped onto N subframes in the increasing order of first time domain and then frequency domain.

According to the present embodiment, in the device 1800, symbols obtained after the process of modulation may be mapped onto different REs in one subframe for different repetition levels in the process of RE mapping.

In addition, in the device 1800 for transmitting data, the data include control information bits such as DCI or traffic data bits. The device 1800 for transmitting data can be used for (E)PDCCH, PDSCH, PUSCH and so on. Thus, the device 1800 can be implemented at both UE side and eNB side. Also, the device 1800 for transmitting data can implement the method 40 as described in any one of the above first to tenth embodiments or any combination thereof.

With the device 1800 for transmitting data, the data are processed by the five processes or by the five processes and at least one additional process to generate different signals to be transmitted according to different repetition levels, thereby the repetition level can be indicated implicitly without additional cost and accordingly the misunderstanding of the repetition level can be avoided.

(Twelfth Embodiment)

Figure 19:
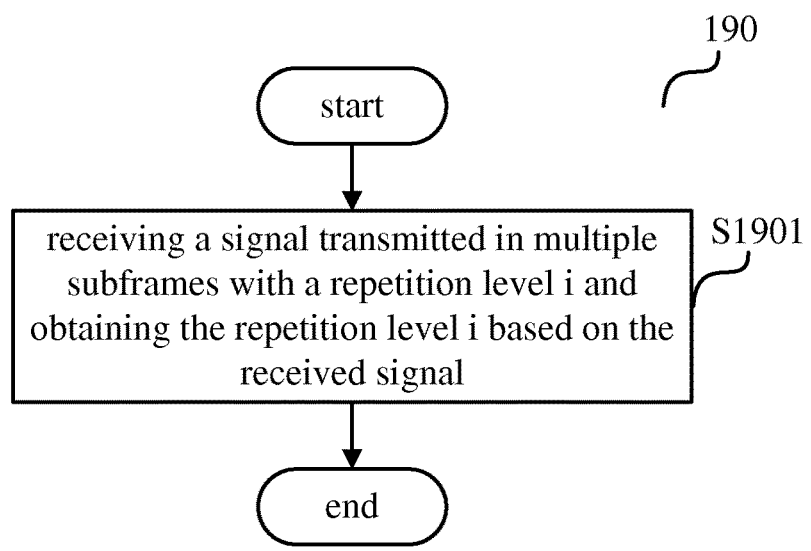
FIG. 19 is a flow chart of a method for receiving data according to the twelfth embodiment of the present disclosure.

FIG. 19 is a flow chart of a method 190 for receiving data according to the twelfth embodiment of the present disclosure. As shown in FIG. 19, the method 190 includes a step S1901. At the step S1901, a signal transmitted in multiple subframes with a repetition level i is received and the repetition level i is obtained based on the received signal. The data are processed in at least five processes of CRC attachment, channel coding, rate matching, modulation and RE mapping to generate the signal. The repetition level i is selected from a repetition level set including at least two different repetition levels, and for repetition level i, the data are transmitted in Ri subframes, and for different repetition levels, values of Ri are different. And, the data are processed by the five processes or by the five processes and at least one additional process to generate different signals to be transmitted according to different repetition levels.

In addition, the method 190 according to the present embodiment can be used for receiving the data transmitted by the method 40 as described in any one of the above first to tenth embodiments or any combination thereof.

With the method 190 for receiving data, the data are processed by the five processes or by the five processes and at least one additional process to generate different signals to be transmitted according to different repetition levels, thereby the repetition level can be indicated implicitly without additional cost and accordingly the misunderstanding of the repetition level can be avoided.

(Thirteenth Embodiment)

Figure 20:
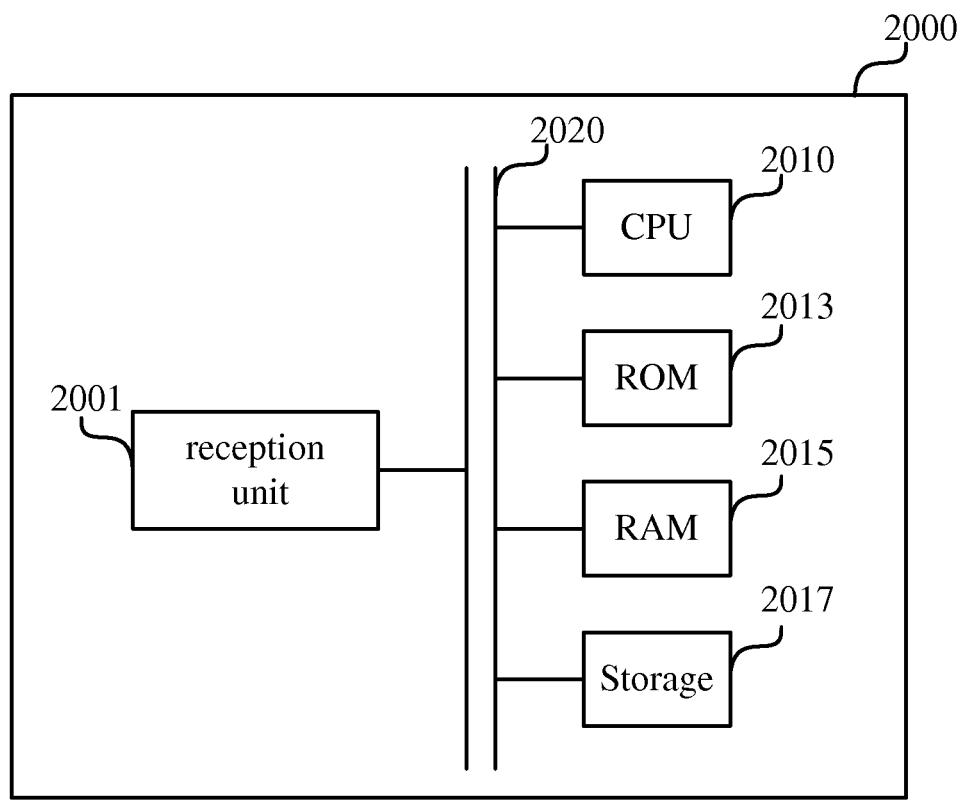
FIG. 20 is a block diagram showing a device for receiving data according to the thirteenth embodiment of the present disclosure.

FIG. 20 is a block diagram showing a device 2000 for receiving data according to the thirteenth embodiment of the present disclosure. As shown in FIG. 20, the device 2000 includes a reception unit 2001 configured to receive a signal transmitted in multiple subframes with a repetition level i and to obtain the repetition level i based on the received signal. The data are processed in at least five processes of CRC attachment, channel coding, rate matching, modulation and RE mapping to generate the signal. The repetition level i is selected from a repetition level set including at least two different repetition levels, and for repetition level i, the data are transmitted in Ri subframes, and for different repetition levels, values of Ri are different. And, the data are processed by the five processes or by the five processes and at least one additional process to generate different signals to be transmitted according to different repetition levels.

The device 2000 for receiving data according to the present embodiment may further include a CPU 2010 for executing related programs to process various data and control operations of respective units in the device 2000, a ROM 2013 for storing various programs required for performing various process and control by the CPU 2010, a RAM 2015 for storing intermediate data temporarily produced in the procedure of process and control by the CPU 2010, and/or a storage unit 2017 for storing various programs, data and so on. The above reception unit 2001, CPU 2010, ROM 2013, RAM 2015 and/or storage unit 2017 etc.

may be interconnected via data and/or command bus 2020 and transfer signals between one another.

Respective units as described above do not limit the scope of the present disclosure. According to one embodiment of the disclosure, the function of the above reception unit 2001 may also be implemented by functional software in combination with the above CPU 2010, ROM 2013, RAM 2015 and/or storage unit 2017 etc.

In addition, in the device 2000 for receiving data, the data include control information bits such as DCI or traffic data bits. The device 2000 for receiving data can be used for (E)PDCCH, PDSCH, PUSCH and so on. Thus, the device 2000 can be implemented at both UE side and eNB side. Also, the device 2000 for receiving data can implement the method 190 as described in the above twelfth embodiment. That is, the device 2000 for receiving data can be used for receiving the data transmitted by the method 40 as described in any one of the above first to tenth embodiments or any combination thereof.

With the device 2000 for receiving data, the data are processed by the five processes or by the five processes and at least one additional process to generate different signals to be transmitted according to different repetition levels, thereby the repetition level can be indicated implicitly without additional cost and accordingly the misunderstanding of the repetition level can be avoided.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for transmitting data, comprising:
processing the data in at least five processes of cyclic redundancy check attachment, channel coding, rate matching, modulation and resource element mapping to generate a signal; and
transmitting the signal in a plurality of subframes with a repetition level i,
wherein the repetition level i is selected from a repetition level set including at least two different repetition levels, and for repetition level i, the data are transmitted in Ri subframes, and for different repetition levels, values of Ri are different, and
wherein the data are processed by the five processes or by the five processes and at least one additional process to generate different signals to be transmitted according to different repetition levels.

2. The method according to claim 1, further comprising a process of bit permutation after the process of cyclic redundancy check attachment and before the process of channel coding, wherein in the process of bit permutation, bit permutation patterns are different for different repetition levels.

3. The method according to claim 1, wherein in the process of rate matching, coding rates are different for different repetition levels.

4. The method according to claim 1, further comprising two processes of repetition and bit permutation after the process of rate matching and before the process of modulation,
wherein, in the process of repetition, m bits obtained after the process of rate matching are repeated into m*M bits in which M is no more than Ri, and
wherein, in the process of bit permutation, bit permutation patterns are different for different repetition levels.

5. The method according to claim 4, wherein in the process of repetition, values of M are different for different repetition levels.

6. The method according to claim 1, further comprising a process of symbol permutation after the process of modulation and before the process of resource element mapping, wherein in the process of symbol permutation, symbol permutation patterns are different for different repetition levels.

7. The method according to claim 6, further comprising a process of repetition after the process of modulation and before the process of symbol permutation, wherein in the process of repetition, n symbols obtained after the process of modulation are repeated into n*N symbols in which N is no more than Ri.

8. The method according to claim 7, wherein in the process of repetition, values of N are different for different repetition levels.

9. The method according to claim 1, further comprising a process of repetition after the process of modulation and before the process of resource element mapping,
wherein in the process of repetition, n symbols obtained after the process of modulation are repeated into n*N symbols in which N is no more than Ri, and values of N are different for different repetition levels, and
wherein in the process of resource element mapping, n*N symbols are mapped onto N subframes in the increasing order of first time domain and then frequency domain.

10. The method according to claim 1, wherein in the process of resource element mapping, symbols obtained after the process of modulation are mapped onto different resource elements in one subframe for different repetition levels.

11. A device for transmitting data, comprising:
a processing unit configured to process the data in at least five processes of cyclic redundancy check attachment, channel coding, rate matching, modulation and resource element mapping to generate a signal; and
a transmission unit configured to transmit the signal in a plurality of subframes with a repetition level i,
wherein the repetition level i is selected from a repetition level set including at least two different repetition levels, and for repetition level i, the data are transmitted in Ri subframes, and for different repetition levels, values of Ri are different, and
wherein the data are processed by the five processes or by the five processes and at least one additional process to generate different signals to be transmitted according to different repetition levels.

12. The device according to claim 11, wherein the processing unit further comprises a process of bit permutation after the process of cyclic redundancy check attachment and before the process of channel coding, wherein in the process of bit permutation, bit permutation patterns are different for different repetition levels.

13. The device according to claim 11, wherein in the process of rate matching, coding rates are different for different repetition levels.

14. The device according to claim 11, wherein the processing unit further comprises two processes of repetition and bit permutation after the process of rate matching and before the process of modulation,
wherein, in the process of repetition, m bits obtained after the process of rate matching are repeated into m*M bits in which M is no more than Ri, and
wherein, in the process of bit permutation, bit permutation patterns are different for different repetition levels.

15. The device according to claim 11, wherein the processing unit further comprises a process of symbol permutation after the process of modulation and before the process of resource element mapping, wherein in the process of symbol permutation, symbol permutation patterns are different for different repetition levels.

16. The device according to claim 15, wherein the processing unit further comprises a process of repetition after the process of modulation and before the process of symbol permutation, wherein in the process of repetition, n symbols obtained after the process of modulation are repeated into n*N symbols in which N is no more than Ri.

17. The device according to claim 11, wherein the processing unit further comprises a process of repetition after the process of modulation and before the process of resource element mapping,
wherein in the process of repetition, n symbols obtained after the process of modulation are repeated into n*N symbols in which N is no more than Ri, and values of N are different for different repetition levels, and
wherein in the process of resource element mapping, n*N symbols are mapped onto N subframes in the increasing order of first time domain and then frequency domain.

18. The device according to claim 11, wherein in the process of resource element mapping, symbols obtained after the process of modulation are mapped onto different resource elements in one subframe for different repetition levels.

19. A method for receiving data, comprising:
receiving a signal transmitted in a plurality of subframes with a repetition level i and obtaining the repetition level i based on the received signal,
wherein the data are processed in at least five processes of cyclic redundancy check attachment, channel coding, rate matching, modulation and resource element mapping to generate the signal,
wherein the repetition level i is selected from a repetition level set including at least two different repetition levels, and for repetition level i, the data are transmitted in Ri subframes, and for different repetition levels, values of Ri are different, and
wherein the data are processed by the five processes or by the five processes and at least one additional process to generate different signals to be transmitted according to different repetition levels.

20. A device for receiving data, comprising:
a reception unit configured to receive a signal transmitted in a plurality of subframes with a repetition level i and to obtain the repetition level i based on the received signal, and
a processor configured to process the signal to obtain the data,
wherein the data are processed in at least five processes of cyclic redundancy check attachment, channel coding, rate matching, modulation and resource element mapping to generate the signal,
wherein the repetition level i is selected from a repetition level set including at least two different repetition levels, and for repetition level i, the data are transmitted in Ri subframes, and for different repetition levels, values of Ri are different, and
wherein the data are processed by the five processes or by the five processes and at least one additional process to generate different signals to be transmitted according to different repetition levels.

* * * * *